(12) United States Patent
Nitta et al.

(10) Patent No.: US 10,053,380 B2
(45) Date of Patent: Aug. 21, 2018

(54) ELECTROLYSIS DEVICE AND APPARATUS FOR PRODUCING ELECTROLYZED OZONATED WATER

(71) Applicants: AQUAECOS LTD., Yokohama-shi, Kanagawa (JP); DE NORA PERMELEC LTD, Fujisawa-shi, Kanagawa (JP)

(72) Inventors: Hideo Nitta, Yokohama (JP); Masashi Hosonuma, Yokohama (JP)

(73) Assignees: AQUAECOS LTD., Yokohama-shi, Kanagawa (JP); DE NORA PERMELEC LTD, Fujisawa-shi, Kanagawa (JP)

( * ) Notice: Subject to any disclaimer, the term of this patent is extended or adjusted under 35 U.S.C. 154(b) by 0 days.

(21) Appl. No.: 15/525,683

(22) PCT Filed: Jun. 30, 2016

(86) PCT No.: PCT/JP2016/069491
§ 371 (c)(1),
(2) Date: May 10, 2017

(87) PCT Pub. No.: WO2017/006837
PCT Pub. Date: Jan. 12, 2017

(65) Prior Publication Data
US 2017/0334750 A1    Nov. 23, 2017

(30) Foreign Application Priority Data
Jul. 3, 2015 (JP) .................................. 2015-134298

(51) Int. Cl.
*C02F 1/467* (2006.01)
*C02F 1/461* (2006.01)

(52) U.S. Cl.
CPC ........ *C02F 1/4672* (2013.01); *C02F 1/46109* (2013.01); *C02F 2001/46161* (2013.01);
(Continued)

(58) Field of Classification Search
CPC .. C02F 2303/04; C02F 1/001; C02F 1/46109; C02F 1/4693; C02F 2201/46;
(Continued)

(56) References Cited

U.S. PATENT DOCUMENTS

| | | | |
|---|---|---|---|
| 2013/0026096 A1 | 1/2013 | Nitta et al. | |
| 2013/0032491 A1 | 2/2013 | Nitta et al. | |
| 2015/0122641 A1 | 5/2015 | Kodama et al. | |
| 2015/0299876 A1 | 10/2015 | Hara et al. | |

FOREIGN PATENT DOCUMENTS

| | | |
|---|---|---|
| CN | 102869615 | 1/2013 |
| CN | 103781731 | 5/2014 |

(Continued)

OTHER PUBLICATIONS

Chinese Office Action, issued in the corresponding Chinese application No. 201680003586.4, dated Jan. 4, 2018, 6 pages.
(Continued)

*Primary Examiner* — Zulmariam Mendez
(74) *Attorney, Agent, or Firm* — Hamre, Schumann, Mueller & Larson, P.C.

(57) ABSTRACT

There is provided an electrolysis device configured to use unpurified water containing a small amount of ions of alkaline earth metal such as Ca and Mg as raw water, and to have a structure of supplying the raw water to a cathode chamber in which deposition of scale of the alkaline earth metal on the surface of a cathode provided in the cathode chamber can be prevented. The electrolysis device and the apparatus for producing electrolyzed ozone water are configured by an electrolysis cell formed in a manner that a membrane-electrode assembly is configured by a solid poly-
(Continued)

mer electrolyte separation membrane formed by a cation exchange membrane, and an anode and a cathode which are respectively adhered to both surfaces of the solid polymer electrolyte separation membrane, and the membrane-electrode assembly is compressed from both surfaces thereof, and thus the solid polymer electrolyte separation membrane, the anode, and the cathode are adhered to each other. A porous conductive metallic material having flexibility and having multiple fine voids therein is used as the cathode, and scale which is mainly formed of hydroxide of alkaline earth metal is stored in fine voids in the cathode, and thus localized deposition of hydroxide of the alkaline earth metal at a contact interface between the cathode and the solid polymer electrolyte separation membrane is prevented.

6 Claims, 3 Drawing Sheets

(52) U.S. Cl.
CPC ............... *C02F 2201/4618* (2013.01); *C02F 2201/46115* (2013.01); *C02F 2303/04* (2013.01)

(58) Field of Classification Search
CPC .... C02F 2201/46115; C02F 2201/4616; C02F 2303/22; C02F 2307/14
See application file for complete search history.

(56) References Cited

FOREIGN PATENT DOCUMENTS

| | | |
|---|---|---|
| DE | 10025167 | 12/2001 |
| DE | 102009005011 | 7/2010 |
| EP | 1762546 | 3/2007 |
| JP | 08-104991 | 4/1996 |
| JP | 10-130876 | 5/1998 |
| JP | 11-302887 | 11/1999 |
| JP | 2000-212785 | 8/2000 |
| JP | 2002-173789 | 6/2002 |
| JP | 2005-177671 | 7/2005 |
| JP | 2008-150665 | 7/2008 |
| JP | 2008-200667 | 9/2008 |
| JP | 2011-050807 | 3/2011 |
| JP | 2011-246799 | 12/2011 |
| JP | 2011-246800 | 12/2011 |
| JP | 2013-256706 | 12/2013 |
| JP | 2014-530291 | 11/2014 |
| WO | 2014/069360 | 5/2014 |

OTHER PUBLICATIONS

Supplementary European Search Report, issued in the corresponding European Patent Application No. EP 16821306.4, dated Apr. 17, 2018, 4 pages.

Taiwanese Office Action, issued in the corresponding Taiwanese patent application 105120905, dated Apr. 11, 2017, 5 pages.

International Search Report and Written Opinion, issued in the corresponding PCT application No. PCT/JP2016/06949, dated Sep. 27, 2016, 11 pages.

ELECTROLYSIS DEVICE AND APPARATUS FOR PRODUCING ELECTROLYZED OZONATED WATER

TECHNICAL FIELD

The present invention relates to an electrolysis device and an apparatus for producing electrolyzed ozone water, configured to use unpurified water containing a small amount of ions of alkaline earth metals such as calcium and magnesium as raw water and to perform electrolysis by a membrane-electrode assembly which is constituted by a solid polymer electrolyte separation membrane formed from a cation exchange membrane, and an anode and a cathode which are respectively adhered to both surfaces of the solid polymer electrolyte separation membrane, and also to the electrolysis device and the apparatus for producing electrolyzed ozone water, which are capable of preventing localized deposition of scale which is mainly formed of hydroxide of the alkaline earth metal, at a contact interface between the cathode and the solid polymer electrolyte separation membrane.

BACKGROUND ART

Water treatment using an electrolytic reaction is widely performed, for example, in order to perform production of functional water, ozone water, and electrolyzed water, sterilization, decomposition and removal of a harmful substance through electrolysis. A reaction tank used in the above process generally has a structure in which an anode, a cathode, and an ion exchange membrane or a porous separation membrane which is interposed between the anode and the cathode are accommodated in a housing. Such a reaction tank is referred to as an electrolytic bath or an electrolysis cell. This type of electrolytic bath or electrolysis cell is configured by a separation membrane, an anode chamber formed by being separated by the separation membrane, a cathode chamber formed by being separated by the separation membrane, an anode provided in the anode chamber, and a cathode provided in the cathode chamber. As this type thereof, a two-chamber type electrolysis device or a three-chamber type electrolysis device is known.

As the two-chamber type electrolysis device, there are a diaphragm process type electrolysis device, a cation exchange membrane type electrolysis device, and a solid polymer electrolyte type electrolysis device which is a special type.

The diaphragm process type electrolysis device uses a porous membrane as a separation membrane. The cation exchange membrane type electrolysis device uses a cation exchange membrane as the separation membrane. The solid polymer electrolyte type electrolysis device configures an electrolysis device in which the anode and the cathode are adhered to both surfaces of the cation exchange membrane, and thus it is possible to perform electrolysis of pure water having small electric conductivity, by using the cation exchange membrane as a solid polymer electrolyte. As the three-chamber type electrolysis device, a device in which a cation exchange membrane and an anion exchange membrane as a separation membrane configured to separate an anode chamber and a cathode chamber from each other are provided between the anode chamber and the cathode chamber, and an intermediate chamber is formed between the cation exchange membrane and the anion exchange membrane is employed. In the electrolysis devices, various types of functional water and ozone water are generated.

Generally, in a waste liquid treatment process or a producing process of functional water such as so-called alkali ion water, unpurified water containing ions of alkaline earth metal, such as a calcium ion and a magnesium ion is used as a raw material. In electrolysis using such unpurified water, while electrolysis is in progress, firstly, pH of a catholyte is increased on the surface of the cathode, and thus ions of alkaline earth metal in which a small amount of calcium in raw water is the main component are deposited on the surface of the cathode, as non-conductive scale, that is, hydroxide, oxide, and carbonate thereof. As a result, continuing electrolysis often becomes difficult.

Thus, in PTL 1 and PTL 2, a method of using acid as a cathode chamber liquid is proposed. However, the configurations in PTL 1 and PTL 2 are complicated, and safety management in operation is burdened. In PTL 3, a method in which an auxiliary tank and a plurality of electrode sets are installed in an apparatus for producing electrolyzed water, and are switched and used for each predetermined time, and thus deposit in a cathode is suppressed is proposed. However, this method causes the size and cost of the apparatus to be increased. Further, in PTL 4, a method in which an operation is suspended for each predetermined time and sediment is removed by acid washing and the like is described in detail. However, the work is complicated. In PTL 5, a method in which an electrolysis cell which does not include a separation membrane is caused to have acidity by using hydrochloric acid, and thus deposit in a cathode is prevented is proposed. However, because a strongly-acidic chemical liquid such as hydrochloric acid is used, this method may be disadvantageous in an aspect of securing of safety or cost, and using of strong acid may be not accepted in accordance with the purpose of the use.

In PTL 6, a method in which an anode and a cathode of an electrolysis cell are reversed to each other when electrolytic properties are deteriorated, and recovery of performance is achieved by passing through a reverse current is proposed. In this case, when such a reverse current flows, the cathode temporarily acts as the anode, and thus the metal constituent is eluted. Many of ions themselves of the eluted metal are not preferable as ions contained in a treatment liquid for each of Cr, Ni, and the like. In addition, the ions are permeated into a solid polymer electrolyte membrane, and thus ion transfer capability thereof is significantly degraded. For this reason, valve metal having high corrosion resistance may be used in the cathode. However, in this case, expensive precious metal coating and the like may be performed on the surface of the valve metal, and, if the coating is not performed, lowering very high electrolysis overvoltage is required. In addition, deterioration of an electrode catalyst or an electrode base by cathodic reduction of the anode which temporarily functions as the cathode, or hydrogen embrittlement occurring by cathodic reduction is also concerned.

Further, according to PTL 7, a method of producing hypochlorite, in which electrolysis of a chloride aqueous solution is performed without separation membrane by using a cathode in which a coated film which is formed on a conductive base and has low hydrogen overvoltage is covered with a reduction prevention coated film, is proposed. As the reduction prevention coated film, an organic cation exchange membrane body, an inorganic cation exchange membrane body, or a mixture thereof is used. However, in an electrolysis method performed without a separation membrane, that is, a method in which a matter generated on the anode is directly brought into contact with the cathode, the reduction prevention coated film functions to prevent reduction of ions of hypochlorous acid, which occurs by the cathode, but does not function to prevent precipitation of cathode deposition which is mainly formed of hydroxide of alkaline earth metal, on the cathode. In an electrolysis method and an electrolysis device using a separation membrane as in the present invention, a reduction prevention film for preventing reduction of ions of hypochlorous acid which is a product in an anode, as described in PTL 7, is not required.

In the electrolysis method and the electrolysis device using a separation membrane in the related art, in a case where unpurified water containing ions of alkaline earth metal is used as a raw material, metal ions ionized as cations is concentrated on the surface of a cathode, and pH is increased by OH⁻ ions generated on the cathode. As a result, scale which is mainly formed of hydroxide precipitates as a cathode deposition. Operation inhibition by the formation of the scale causes a problem. However, in a method of suppressing formation of scale, which has been conventionally proposed, a negative aspect in that corresponding cost and labors are required, or a portion of capability is to be abandoned is large. Thus, improvement is desired.

Ozone water exhibits an advantageous effect of sterilization and the like when ozone in the ozone water is decomposed. However, after the ozone is decomposed, only stable oxygen remains. Thus, the ozone water attracts attentions as a treatment agent having a very low environmental load. Currently, the ozone water is used for decomposing an organic matter, for example, used for sterilization or decolorization, deodorization, or the like. Henceforth, further wide use of the ozone water, for example, for preventing infection diseases is expected.

In an ozone water generation cell by an electrolysis process, generally, a so-called membrane-electrode assembly is configured as a function unit. The membrane-electrode assembly has a structure in which an anode for generating ozone, such as a diamond electrode, a cathode formed of stainless steel or the like, and a cation exchange membrane interposed between the anode and the cathode are strongly adhered to each other. If a direct current is applied between the anode and the cathode in the membrane-electrode assembly, oxygen and ozone are generated on the surface of the anode in a form of a gas, and a considerable amount of the ozone gas is dissolved in the surrounding raw water. Thus, water in which an ozone gas is dissolved, that is ozone water, is generated.

One problem in the above process is that generation efficiency of ozone water is much lower than a theoretical value for ozone gas generation.

The inventors found that the amount of dissolved ozone gas, which determines ozone water generation efficiency, strongly depends on a flow rate of raw water in the vicinity of the electrode. However, it is considered that this phenomenon suggests the followings: a point that local ozone concentration in water is rapidly locally saturated in the ozone evolution site; and a point that fine ozone gas bubbles just after evolution stay in a gas generation site, and rapidly grow to be larger gas bubbles, and as a result, it becomes difficult for the ozone gas to efficiently dissolve.

Considering the above problems and afterward marketability, the inventors proposed an electrolysis cell which was to solve the above problems, and had a structure in which a plurality of through hole were provided in a membrane-electrode assembly, and raw water passed through the holes in unidirection. The inventors applied for a patent (PTL 8) which disclosed that it is possible to improve ozone water generation efficiency by the proposed electrolysis cell.

According to an apparatus for producing electrolyzed ozone water in PTL 8, an anolyte (acidic ozone water which is an anode product) in an anode chamber and a catholyte (alkali hydroxide which is a cathode product) generated in a cathode chamber are mixed, and integrally flow out. Thus, the catholyte is mixed with the acidic ozone water which is the anolyte generated on the anode, and pH on the surface of the cathode is lowered from alkalinity to the vicinity of neutrality. Thus, an occurrence of a situation in which scale which is mainly formed of hydroxide of alkaline earth metal precipitates on the surface of the cathode is considerably suppressed.

However, the followings are understood in the apparatus for producing electrolyzed ozone water in PTL 8. That is, a rigid material such as precious metal, nickel, stainless steel, and titanium is used in the cathode. Almost all of scale which is mainly formed of hydroxide of alkaline earth metal, such as calcium hydroxide and magnesium hydroxide, which precipitates in the vicinity of a contact interface between the cathode and a solid polymer electrolyte separation membrane without coming into contact with acidic ozone water which is an anolyte generated on the anode side is not stored in the cathode, and does not pass through multiple through holes formed in the cathode. Almost all of the scale is deposited at the contact interface between the cathode and the solid polymer electrolyte separation membrane. Thus, continuing electrolysis may be interfered.

In addition, the followings are understood. The cathode is formed from a rigid material, and does not have flexibility. Thus, even though the cell is formed as a solid polymer type electrolysis cell by compressing from both sides thereof, the cathode, the anode, and the solid polymer separation membrane are not sufficiently adhered to each other, and a cell voltage is increased.

CITATION LIST

Patent Literature

[PTL 1] JP 2002-173789A
[PTL 2] JP 2005-177671A
[PTL 3] JP 2011-050807A
[PTL 4] JP 10-130876A
[PTL 5] JP 2008-200667A
[PTL 6] JP 2008-150665A
[PTL 7] JP 08-104991A
[PTL 8] JP 2011-246799A

SUMMARY OF INVENTION

Technical Problem

An object of the present invention is to solve the above problems in the method of the related art, and to provide an electrolysis device and an apparatus for producing electrolyzed ozone water. The electrolysis device and the apparatus for producing electrolyzed ozone water performs electrolysis in a membrane-electrode assembly configured by a solid polymer electrolyte separation membrane formed from a cation exchange membrane, and an anode and a cathode which are respectively adhered to both surfaces of the solid polymer electrolyte separation membrane. In a case where unpurified water containing a small amount of ions of alkaline earth metal such as calcium and magnesium is used as a raw material, localized deposition of scale which is mainly formed of hydroxide of the alkaline earth metal, at a contact interface between the cathode and the solid polymer electrolyte separation membrane can be prevented.

The present invention relates to an electrolysis device and an apparatus for producing electrolyzed ozone water which performs electrolysis by using unpurified water containing a small amount of ions of alkaline earth metal such as calcium and magnesium, as a raw material. More specifically, a device which uses unpurified water as raw water and solves problems occurring by deposit of hydroxide on a cathode in an apparatus for producing electrolyzed ozone water, an apparatus for producing functional water, an apparatus for producing electrolyzed water, a sterilizer, an apparatus for treating waste water, and the like is proposed. According to the electrolysis device and the apparatus for producing electrolyzed ozone water in the present invention, solving similar problems for other purposes can be expected.

Further, the inventors examined various flow passage structures passing through a membrane-electrode assembly in order to improve flow of raw water (tap water) which flows in the vicinity of an electrode. As a result, the inventors developed an electrolysis cell for producing ozone water which shows ozone water production efficiency much higher than that in the electrolysis cell of the related art, has an electrolytic voltage lower than that in the electrolysis cell of the related art, has high power efficiency which is a product of a percentage of an actual electrolytic voltage and current efficiency, and thus has small amount of consumed energy. The inventors verified effectiveness.

Solution to Problem

To achieve the above object, a first solution in the present invention includes an electrolysis cell formed in a manner that a membrane-electrode assembly is compressed from both sides so as to adhere an anode, a cathode, and a solid polymer electrolyte separation membrane formed from a cation exchange membrane to each other, the membrane-electrode assembly being configured by the solid polymer electrolyte separation membrane formed from the cation exchange membrane, and the anode and the cathode which are respectively adhered to both surfaces of the solid polymer electrolyte separation membrane; means for supplying raw water composed of unpurified water containing alkaline earth metal, to at least one of the anode and the cathode; and means for mixing an anolyte generated on the anode with a catholyte generated on the cathode, wherein a porous conductive metal material which has flexibility and in which multiple fine voids are provided is used as the cathode, and scale which is mainly formed of hydroxide of the alkaline earth metal is stored in the fine void in the cathode so as to prevent localized deposition of the scale which is mainly formed of hydroxide of the alkaline earth metal at a contact interface between the cathode and the solid polymer electrolyte separation membrane.

According to a second solution in the present invention, in the above apparatus for producing electrolyzed water, an electrolysis cell having a monopolar stack structure is configured in a manner that at least new one membrane-electrode assembly which has the same structure as a structure of the membrane-electrode assembly is further connected to an outside of the cathode and/or the anode in the membrane-electrode assembly, so as to bring the cathodes into contact with each other and/or bring the anodes into contact with each other in the membrane-electrode assemblies is further configured.

According to a third solution in the present invention, in the above apparatus for producing electrolyzed water, an electrolysis cell having a bipolar stack structure is configured in a manner that at least new one different membrane-electrode assembly which has the same structure as a structure of the membrane-electrode assembly is further connected to an outside of the cathode and/or the anode in the membrane-electrode assembly, so as to bring the cathode and the anode into contact with each other in the membrane-electrode assemblies is further configured.

According to a fourth solution in the present invention, in the above apparatus for producing electrolyzed water, the cathode is formed by at least one porous conductive metal material selected by a group formed from a metal foam, a metallic fiber cloth, and a fibrous metal molded body.

According to a fifth solution in the present invention, in the above apparatus for producing electrolyzed water, in a case where the cathode is positioned in an outermost layer of the electrolysis cell, the cathode is supported by a rigid cathode substrate formed of a plate material, a mesh, or perforated punching metal.

According to a sixth solution in the present invention, there is provided an apparatus for producing electrolyzed ozone water which produces ozone water by performing electrolysis of unpurified water containing ions of alkaline earth metal by using the above apparatus for producing electrolyzed water.

Advantageous Effects of Invention

According to the present invention, in an electrolysis device and an apparatus for producing electrolyzed ozone water having a structure in which an anolyte generated on an anode and a catholyte generated on a cathode are mixed by using a membrane-electrode assembly configured by a solid polymer electrolyte separation membrane formed from a cation exchange membrane, and the anode and the cathode which are respectively adhered to both surfaces of the solid polymer electrolyte separation membrane, a porous metal material having flexibility and having multiple fine voids therein is used as the cathode. Thus, sufficient contact with acidic ozone water which is the anolyte generated on the anode is possible, and generating hydroxide of the alkaline earth metal is suppressed. Further, scale which is mainly formed of hydroxide of the alkaline earth metal is stored in the fine voids in the cathode, and thus localized deposition of the scale which is mainly formed of hydroxide of the alkaline earth metal, at a contact interface between the cathode and the solid polymer electrolyte separation membrane is prevented. Thus, even though various means according to the related art, as described above, are not employed, deposit of hydroxide and the like on the surface of the cathode is suppressed, and thus an increase in electrolytic voltage is suppressed. As a result, it is possible to stably perform electrolysis operation for a long term. The reason is considered as follows. Cathode deposit is not concentrated on an opposing surface to the anode, that is, on an electrolytic reaction surface having low solution resistance, but dispersed in the entirety of the cathode. Thus, a situation in which sediment of hydroxide and the like directly covers a cathode catalytic surface which is a reaction surface does not occur. Accordingly, it is difficult to inhibit the hydrogen generation reaction on the cathode.

That is, it is predicted that hydroxide of alkaline earth metal is stored in fine voids in the cathode with time, because of the following points. One point is as follows. A small amount of ions of alkaline earth metal in raw water, for example, $Ca^{2+}$ is drawn to the surface of the cathode, and thus a cathode reaction, that is, $Ca^{2+}+2H_2O+2e^-\rightarrow$ Ca(OH)$_2$+H$_2$ occurs. Further, a cathode reaction is performed on a small amount of ions of alkali metal which is contained together in many cases, for example, Na$^+$, that is, Na$^+$+H$_2$O+e$^-$→NaOH+(½)H$_2$, and thus the surface of the cathode has alkalinity. However, in the porous medium in the cathode, the ions are mixed and brought into contact with acidic ozone water which is an anolyte generated on the anode is performed, and thus has properties near to neutrality. Another point is that the inner and outer portions of the porous medium may have an equipotential. Actually, sediment on the cathode is provided on the back surface in addition to a portion thereof opposing the anode, and is substantially uniformly distributed on the entirety of the inner surface and outer surface of the cathode. This is confirmed by performing visual observation or observation with a magnifier on the cathode after electrolysis is performed for a long term. As described above, the contact interface itself between the solid polymer electrolyte separation membrane (cation exchange membrane) and the cathode is not directly and preferentially covered with a deposition layer of Ca(OH)$_2$, and electrolysis continues.

That is, according to the present invention, effects as follows are confirmed.

1) A porous conductive metal material formed by a material having high flexibility is used as the cathode, and thus adhesiveness between the solid polymer electrolyte separation membrane (cation exchange membrane) and the anode is ensured. In addition, a contact area is increased by a micro-unevenness, and thus an actual current density is reduced.

Regarding this point, according to the present invention, as will be described later, it is confirmed that large dependency in that "a voltage increase rate by scaling is proportional to the square or the cube of current density" is shown.

2) Deposition of calcium is not concentrated at a contact portion between the solid polymer electrolyte separation membrane (cation exchange membrane) and the cathode, that is, at a functional portion for hydrogen generation, but is dispersed in the porous cathode thus. Thus, it is difficult to inhibit a cathodic reaction.

3) A porous conductive metal material having multiple fine voids therein is used as the cathode, and thus the fine voids in the cathode function as a storage for a certain type relating to scale, and there is an effect of delaying an occurrence of a lifting phenomenon in which a film by scale formed at an interface between the cathode and the solid polymer electrolyte separation membrane (cation exchange membrane) is therefore separated from the cathode.

DESCRIPTION OF EMBODIMENTS

Hereinafter, regarding the conventional electrolysis device which is the premise of the present invention, and an embodiment of an electrolysis device according to the present invention, an apparatus for producing electrolyzed ozone water will be described with reference to the drawings.

As described above, ozone water exhibits an advantageous action such as sterilization, when ozone in the ozone water is decomposed. After the ozone is decomposed, only stable oxygen remains. Thus, the ozone water attracts attentions as a treatment agent having a very low environmental load. Currently, the ozone water is used for decomposing an organic matter, for example, used for sterilization or decolorization, deodorization, or the like. Henceforth, further wide use of the ozone water, for example, preventing infection diseases is expected.

In an ozone water generation cell by an electrolysis method, generally, a so-called membrane-electrode assembly is configured as a function unit. The membrane-electrode assembly has a structure in which an anode for generating ozone, such as a diamond electrode, a cathode formed of stainless steel or the like, and a solid polymer electrolyte separation membrane which is formed from a cation exchange membrane and is interposed between the anode and the cathode are strongly adhered to each other. If a DC current is applied between the anode and the cathode in the membrane-electrode assembly, oxygen and ozone are generated on the surface of the anode in a form of a gas, and a considerable amount of the ozone gas is dissolved in the surrounding raw water. Thus, water in which an ozone gas is dissolved, that is, ozone water is generated.

One problem in the above process is that generation efficiency of ozone water is much lower than a theoretical value when an ozone gas is generated.

The inventors found that the amount of dissolved ozone gas, which determines ozone water generation efficiency, strongly depends on a flow rate of raw water in the vicinity of the electrode. However, it is considered that this phenomenon suggests the followings: a point that ozone concentration in water is rapidly locally saturated in an ozone generation site; and a point that fine ozone gas bubbles just after evolution stay in the gas evolution sites, and rapidly grow to be larger gas bubbles, and as a result, it becomes difficult for the ozone gas to efficiently dissolve.

Considering the above problems and afterward marketability, the inventors proposed an electrolysis cell which was to solve the above problems, and had a structure in which a plurality of through hole were provided in a membrane-electrode assembly, and raw water passed through the holes in unidirection. The inventors applied for a patent (PTL 8) which disclosed that it is possible to improve efficiency more.

Further, the inventors examined various flow passage structures passing through a membrane-electrode assembly in order to improve flow of raw water (tap water) which flows in the vicinity of an electrode. As a result, the inventors developed an electrolysis cell for producing ozone water that shows ozone water production efficiency much higher than that in the electrolysis cell of the related art, has an electrolytic voltage lower than that in the electrolysis cell of the related art, has high power efficiency which is a product of a ratio of the theoretical voltage over an actual electrolytic voltage and current efficiency, and thus demands small amount of consumed energy. The inventors verified effectiveness.

Further, as will be described later, the inventors found that a very useful and remarkable phenomenon is exhibited in the process of developing the invention of the above technology. The phenomenon is that a porous metal material which has flexibility and multiple fine voids therein is used as a cathode material of an electrolysis cell, and scale which is mainly formed of hydroxide of the alkaline earth metal is stored in the fine voids in the cathode, and thus it is possible to prevent localized deposition of the scale which is mainly formed of the hydroxide of the alkaline earth metal, on the surface of the cathode.

The present invention is developed on the premise of a cell structure in which an anode chamber and a cathode chamber are not separated from each other in order to cause the electrolysis cell to be compact, and on the premise that chemicals are not used by emphasizing easiness of an operation maintenance.

In the present invention, the followings are found. A porous metallic material is used as a cathode body, and thus inhibition of electrolysis by hydroxide (scale) which is deposited in a cathode in a case where electrolysis is performed by using unpurified water containing a small amount of ions of alkaline earth metal such as calcium and magnesium, for example, general tap water, as raw material is significantly reduced.

That is, according to the present invention, it is possible to continuously use an ozone generation device having high efficiency, for a long term without employing other measures for preventing deposition of scale.

Figure 1:
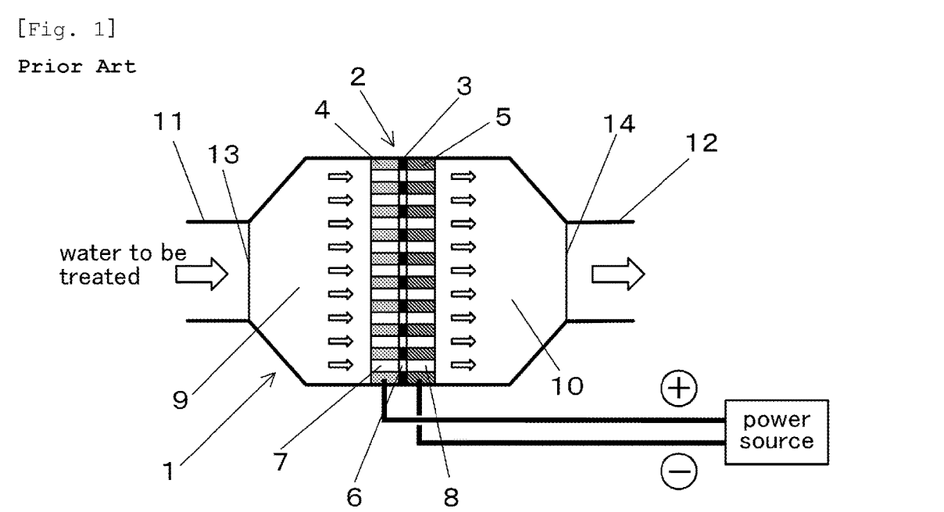
FIG. 1 is a sectional view illustrating one example of a solid polymer type electrolysis cell which is one example of an electrolysis device in the related art.

FIG. 1 illustrates a conventional apparatus for producing electrolyzed ozone water, which is disclosed in PTL 8. 1 indicates an electrolysis cell, and 2 indicates a membrane-electrode assembly. In the membrane-electrode assembly 2, an anode 4 is adhered onto one side surface of a solid polymer electrolyte separation membrane 3 formed from a cation exchange membrane. The anode 4 is formed in a manner that an anodic catalyst for ozone generation is held by a structure body having a predetermined shape and predetermined physical properties. A cathode 5 is adhered onto the other side surface of the solid polymer electrolyte separation membrane 3 formed from the cation exchange membrane. The cathode 5 is formed in a manner that a cathodic catalyst for hydrogen generation is held by a structure body having a predetermined shape and predetermined physical properties.

A plurality of through holes 6, 7, and 8 having a diameter of 0.1 mm or more are provided over the entire surface of the solid polymer electrolyte separation membrane 3, the anode 4, and the cathode 5. The plurality of through holes 6, 7, and 8 are formed over the entire surface of the anode 4, the cathode 5, and the solid polymer electrolyte separation membrane 3. Thus, a raw liquid and an electrolysis product are transitioned from the anode side to the cathode side, or from the cathode side to the anode side through the through holes 6, 7, and 8. In order to smoothly perform transition of the raw liquid and the electrolysis product from the anode side to the cathode side, or from the cathode side to the anode side, the through holes 6, 7, and 8 in the anode 4, the cathode 5, and the solid polymer electrolyte separation membrane 3 are respectively provided at the corresponding portions.

9 indicates an anode chamber provided on the front surface of the anode 4. 10 indicates a cathode chamber provided on the front surface of the cathode 5. 11 indicates a pipe for supplying raw water to the anode chamber 9 of the electrolysis cell 1. 12 indicates a pipe for allowing ozone water generated by electrolysis in the cathode chamber 10 of the electrolysis cell 1 to flow out. 13 indicates an inflow port for supplying the raw water to the anode chamber 9 of the electrolysis cell 1. 14 indicates an outflow port for allowing the ozone water in the cathode chamber 10 of the electrolysis cell 1 to flow out.

Regarding water to be treated, which is raw water, the inflow port 13 of raw water and the pipe 11 for supplying the raw water are connected to the anode chamber 9 in a direction which is perpendicular or oblique to the surfaces of the anode 4, the solid polymer electrolyte separation membrane 3, and the cathode 5. In addition, the outflow port 14 of ozone water and the pipe 12 for allowing the ozone water to flow out are connected to the cathode chamber 10 in a direction which is perpendicular or oblique to the surfaces of the anode 4, the solid polymer electrolyte separation membrane 3, and the cathode 5.

The electrolysis cell 1 can be placed in an oblique direction, in addition to a direction perpendicular to a direction in which raw water flows. In a case where the electrolysis cell is provided in the oblique direction, it is possible to enlarge the electrolysis area, and to further increase its current efficiency and the amount of generated ozone.

As described above, according to the conventional apparatus for producing electrolyzed ozone water, which is disclosed in PTL 8, an anolyte (ozone water which is an anodic product) in the anode chamber 9 and a catholyte (alkali hydroxide which is a cathodic product) generated in the cathode chamber 10 are mixed, and integrally flow out. Thus, the catholyte is mixed with ozone water which is the anolyte generated on the anode side. pH on the surface of the cathode transits from the alkaline side to the neutral side. Thus, deposition of hydroxide of alkaline earth metal on the surface of the cathode is suppressed to a certain degree.

However, according to the conventional apparatus for producing electrolyzed ozone water, which is disclosed in PTL 8, the followings are understood. That is, a rigid material such as precious metal, nickel, stainless steel, and titanium is used in the cathode 2. Almost all of scale which is mainly formed of hydroxide of alkaline earth metal, such as calcium hydroxide and magnesium hydroxide, which precipitates in the vicinity of the solid polymer electrolyte separation membrane 3 is not stored in the cathode, and does not pass through multiple through holes 8 formed in the cathode 5. Almost all of the scale is deposited at a contact interface between the cathode 5 and the solid polymer electrolyte separation membrane 3. Thus, continuing electrolysis may be interfered.

In addition, it is understood that the cathode 5 is formed from a rigid material, which does not have flexibility, and therefore, even though the cell is formed as a solid polymer type electrolysis cell by compressing from both sides thereof, scale preferentially precipitates in a gap between the cathode and the separation membrane, which is generated by the cathode, the anode and the solid polymer separation membrane being not adhered to each other. Thus the cell voltage increases.

Figure 2:
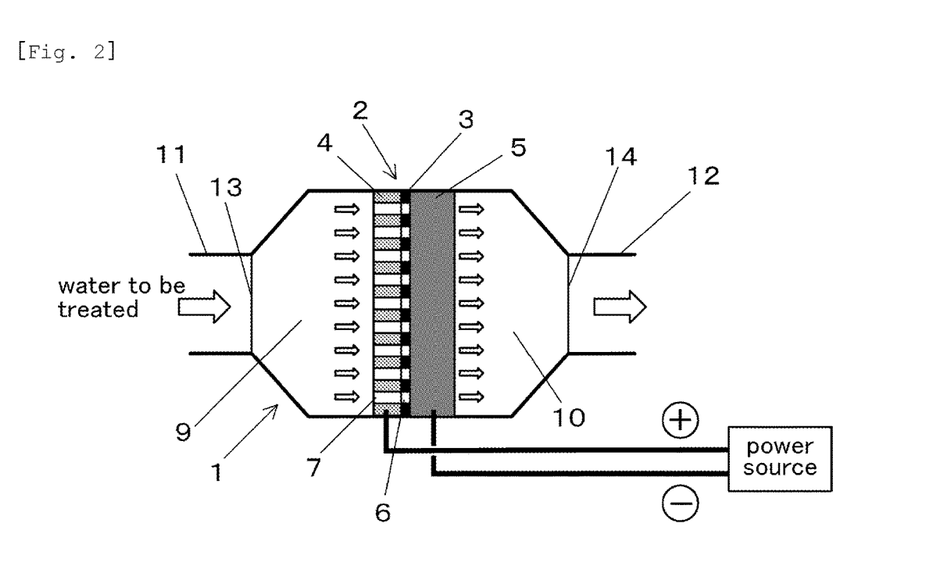
FIG. 2 is a sectional view illustrating one example of an electrolysis device according to the present invention.

FIG. 2 illustrates an embodiment of the electrolysis device according to the present invention. In one embodiment of the present invention illustrated in FIG. 2, in the electrolysis device of the related art illustrated in FIG. 1, a porous conductive material which has flexibility and has multiple fine voids therein is used as the cathode 5. Scale which is mainly formed of hydroxide of the alkaline earth metal is stored in the fine voids in the cathode, and thus localized deposition of the scale which is mainly formed of hydroxide of the alkaline earth metal, at a contact interface between the cathode and the solid polymer electrolyte separation membrane is prevented.

That is, in the present invention, as illustrated in FIG. 2, the membrane-electrode assembly 2 is configured by the solid polymer electrolyte separation membrane 3 that is formed from a cation exchange membrane, the anode 4 and the cathode 5 which are respectively adhered to both surfaces of the solid polymer electrolyte separation membrane 3. The electrolysis cell 1 is made by compressing the membrane-electrode assembly 2 from both surfaces thereof such that the solid polymer electrolyte separation membrane 3 formed of the cation exchange membrane, the anode 4, and the cathode 5 are adhered to each other.

According to the present invention, as illustrated in FIG. 2, in at least any one of the anode 4 and the cathode 5, raw water composed of unpurified water containing alkaline earth metal is allowed to flow into the anode chamber 9 through the inflow port 13, by using the supply pipe 11, so as to perform electrolysis. An anolyte which is ozone water generated in the anode chamber 9 flows into the cathode chamber 10 through the through hole 7 of the anode 4, the through hole 6 of the solid polymer electrolyte separation membrane 3 formed from the cation exchange membrane, and an internal space of the porous conductive metallic material of the cathode 5. Then, the anolyte is mixed with a catholyte, and a mixture thereof flows out of the outflow pipe 12 through the outflow port 14.

The present invention is characterized in that a porous conductive metallic material which has flexibility and has multiple fine voids therein is used as the cathode, scale which is mainly formed of hydroxide of the alkaline earth metal is stored in the fine voids in the cathode, and thus localized deposition of the scale, which is mainly formed of hydroxide of the alkaline earth metal, at a contact interface between the cathode and the solid polymer electrolyte separation membrane is prevented.

The electrolysis device in the present invention is applied to an electrolysis device having a structure in which anolyte and catholyte are mixed. As the electrolysis device having this type of structure, an electrolysis device having a structure as follows is exemplified.

(1) An electrolysis device in which raw water formed by unpurified water containing alkaline earth metal is supplied to any one of an anode chamber and a cathode chamber, and a through hole is provided in a solid polymer electrolyte separation membrane configured by an anode, a cathode, and a cation exchange membrane.

(2) An electrolysis device, as illustrated in FIG. 2, in which perforated metal such as expanded metal is used as the anode 4, a through hole is provided in the solid polymer electrolyte separation membrane 3 formed of a cation exchange membrane, and a porous conductive metallic material is used as the cathode 5.

Figure 3:
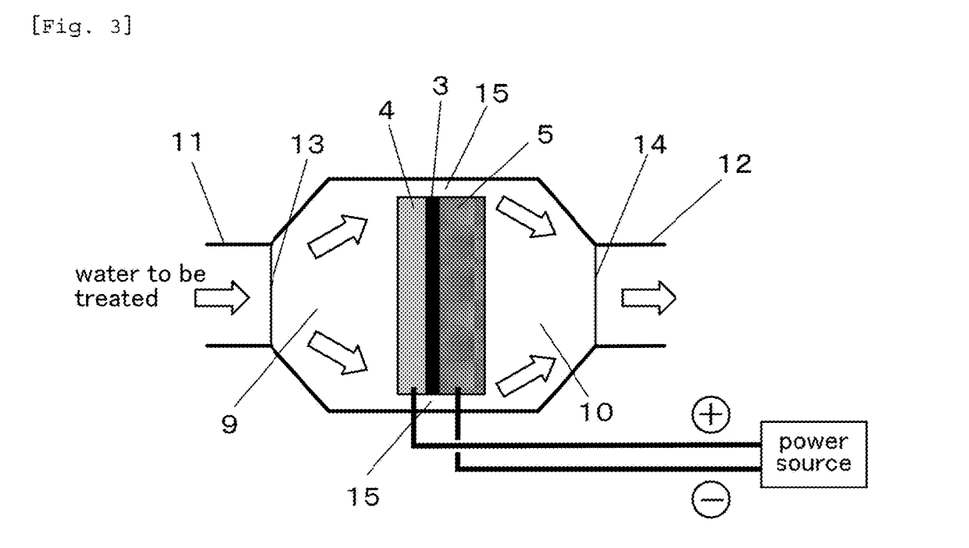
FIG. 3 is a sectional view illustrating another example of the electrolysis device according to the present invention.

(3) An electrolysis device, as illustrated in FIG. 3, in which a flow passage 15 for an electrolyte is provided at an upper portion and/or a lower portion of the membrane-electrode assembly 2, raw water formed by unpurified water containing alkaline earth metal is supplied to any one of the anode chamber 9 and the cathode chamber 10, and an anolyte and a catholyte are mixed through the flow passage 15 for an electrolyte at the upper portion and/or the lower portion of the membrane-electrode assembly 2.

Figure 4:
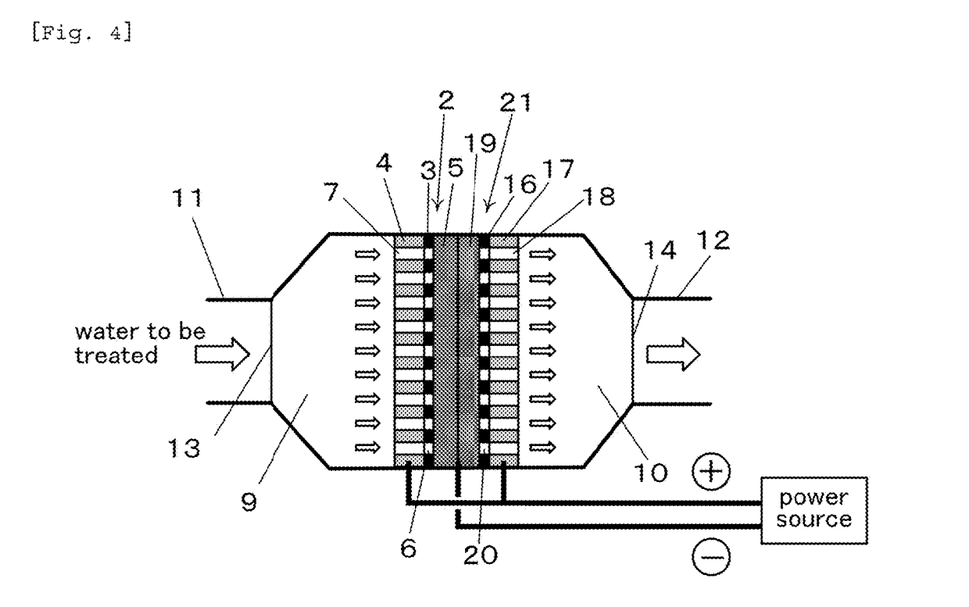
FIG. 4 is a sectional view illustrating still another example (monopolar stack structure) of the electrolysis device according to the present invention.
Figure 5:
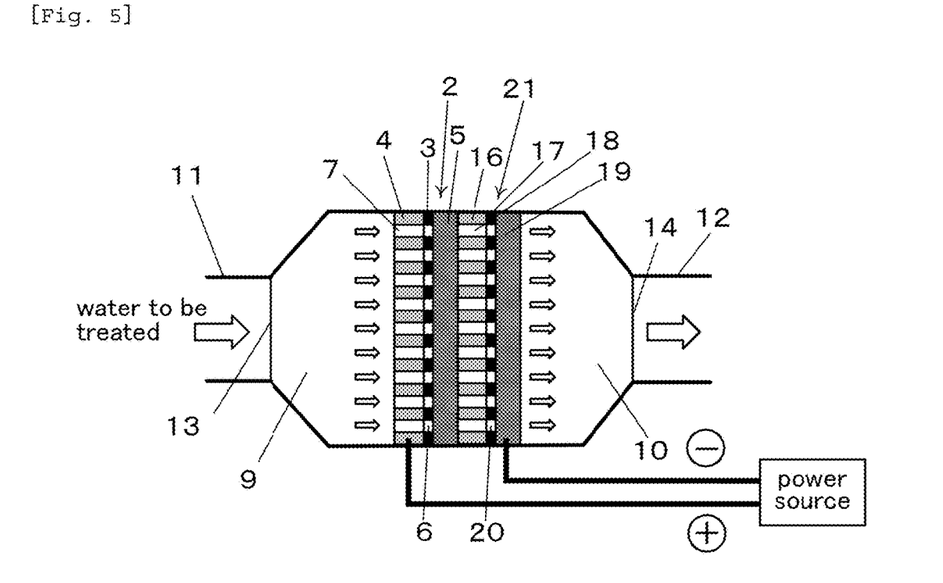
FIG. 5 is a sectional view illustrating still another example (bipolar stack structure) of the electrolysis device according to the present invention.

(4) An electrolysis device in which one or a plurality of membrane-electrode assemblies illustrated in FIG. 2, 4, or 5 are arranged at an interval in the electrolysis device with being inclined, so as to form a flow passage for a liquid at an upper portion and/or a lower portion, and, in a case where raw water formed by unpurified water containing alkaline earth metal is supplied to any one of the anode chamber 9 and the cathode chamber 10 in an orthogonal direction or an oblique direction, similarly to that in FIG. 3, a flow passage 15 for an electrolyte is formed at an upper portion and/or a lower portion of the membrane-electrode assembly 2.

(5) An electrolysis device in which a solid polymer electrolyte separation membrane formed from a cation exchange membrane which is not subjected to hole machining is used as a membrane-electrode assembly, raw water formed by unpurified water containing alkaline earth metal is supplied to any one or both of the anode chamber and the cathode chamber, and an anolyte and a catholyte which are generated in the anode chamber or the cathode chamber are mixed in the outside of the system, or an electrolysis device in which the anode chamber and the cathode chamber are linked to each other by a communication tube, and thus the anolyte and the catholyte are mixed in the system.

Further, in the present invention, a structure in which at least one selected from a group configured by the solid polymer electrolyte separation membrane formed from the cation exchange membrane, the anode, and the cathode is connected to the outside of the cathode and/or the anode in the membrane-electrode assembly such that solid polymer electrolyte separation membranes formed from the cation exchange membrane do not come into contact with each other, and the outermost layer of the membrane-electrode assembly functions as the anode or the cathode can be made.

FIG. 4 illustrates an example of the above structure, and illustrates still another embodiment in the present invention. FIG. 4 illustrates an example in which a new membrane-electrode assembly 21 having the same structure as that of the membrane-electrode assembly 2 is connected to the outside of the membrane-electrode assembly 2 illustrated in FIG. 2, so as to cause the cathode 5 in the membrane-electrode assembly 2 to come into contact with a cathode 19 in the membrane-electrode assembly 21, and thereby an electrolysis cell having a monopolar stack structure is configured. 16 indicates a solid polymer electrolyte separation membrane of the membrane-electrode assembly 21, which is formed from a cation exchange membrane. 17 indicates an anode of the membrane-electrode assembly 21. 18 indicates a through hole provided in the anode 17. 19 indicates a cathode of the membrane-electrode assembly 21. 20 indicates a through hole provided in the solid polymer electrolyte separation membrane 16 of the membrane-electrode assembly 21, which is formed from a cation exchange membrane. The cathode 5 and the cathode 19 may be configured by one cathode member.

By configured as above, a reaction area is increased to be twice, and thus treatment capability is doubled for the same projection area. In addition, in the configurations in FIG. 2 or 3, a structure body for mechanically supporting a cathode material formed of a flexible porous medium from the back surface is required. However, if the configuration illustrated in FIG. 4 is employed, such a support member may be omitted.

In this type of electrolysis cell configured by a monopolar stack structure, it is possible that a cathode 19 of a new membrane-electrode assembly 21 having the same structure as that of the membrane-electrode assembly 2 may not come into contact with the outside of the cathode 5 in the membrane-electrode assembly 2, but the anode 4 in the membrane-electrode assembly 2 may come into contact with the anode 17 in the membrane-electrode assembly 21.

FIG. 5 illustrates another embodiment of the present invention, and illustrates an example in which a new membrane-electrode assembly 21 having the same structure as that of the membrane-electrode assembly 2 is connected to the outside of the cathode 5 in the membrane-electrode assembly 2 illustrated in FIG. 2, so as to cause the cathode 5 of the membrane-electrode assembly 2 and the anode 17 of the membrane-electrode assembly 21 to come into contact with each other, and thereby an electrolysis cell having a bipolar stack structure is configured.

With this electrolysis cell, similarly to the example of the electrolysis device illustrated in FIG. 4, a reaction area is increased to be twice. Thus, treatment capability of twice for the same projection area is obtained. Also in the example of the electrolysis device illustrated in FIG. 5, a support member other than a cathode which functions as a termination portion is not required except for a case where the cathode 5 functions as the termination.

The cathode used in the present invention is firstly required to have flexibility. The reason is as follows. The cathode is used in the membrane-electrode assembly, and thus, if the cathode is highly rigid, when the membrane-electrode assembly is compressed from both sides, the solid polymer electrolyte separation membrane formed from a cation exchange membrane, the anode, and the cathode may not be adhered to each other, and a cell voltage may be increased. Accordingly, it is necessary that the cathode has sufficient flexibility.

The cathode used in the present invention is secondly required to be made of a porous conductive metallic material having multiple fine voids therein. If the cathode is configured a rigid material such as a plate material, a mesh, or perforated punching metal, which has been used conventionally, almost all of scale which is mainly formed of hydroxide of alkaline earth metal such as calcium and magnesium, which precipitates on the surface of the solid polymer electrolyte separation membrane formed from a cation exchange membrane, is not stored in the cathode, and does not pass through multiple through holes formed in the cathode. Hence, almost all of the scale is rapidly deposited at a contact interface between the cathode and the solid polymer electrolyte separation membrane. Thus, continuing electrolysis is interrupted.

Further, the cathode used in the present invention is thirdly required to be configured by a material which allows a liquid such as an anolyte and a catholyte to smoothly flow through. The reason is as follows. If acidic ozone water which is generated in the anode chamber horizontally and vertically moves in the internal space of the cathode and stays in the membrane-electrode assembly, the acidic ozone water may reach the contact interface between the cathode and the solid polymer electrolyte separation membrane. Thus, forming scale which is mainly formed of hydroxide of alkaline earth metal is suppressed. As a result, an increase in cell voltage is delayed.

Accordingly, a porous conductive metallic material is used as the cathode material used in the present invention. As the porous conductive metallic material, preferably, at least one porous conductive metallic material selected from a group configured by a metal foam, metallic fiber cloth, and a fibrous metal molded body is provided. As the most preferable specific material, a nickel foam, a SUS foam, and SUS non-woven fabric are used. Precious metal and precious metal oxide may be appropriately coated thereon as an electrode catalyst in accordance with the use.

Since the cathode in the present invention is used in a membrane-electrode structured assembly, even though the flexibility is required, the cathode is preferably supported by a rigid cathode member so as to be capable of withstanding external stress of deformation.

Thus, in the present invention, the cathode positioned on the outermost layer of the membrane-electrode assembly is preferably held by a rigid cathode member formed of a plate material, a mesh, or perforated punching metal.

As the cathode substrate, a substrate which is appropriate in accordance with the purpose is selected from iron and alloys thereof including stainless steel, nickel and alloys thereof, copper and alloys thereof, aluminum and alloys thereof, and titanium, zirconium, molybdenum, tungsten, and silicon, and alloys or carbide thereof, carbon and allotropes thereof, and the like. The substrate material can be selected in accordance with the use in applying the present invention. Precious metal and precious metal oxide may be appropriately used as an electrode catalyst in accordance with the use, and these substances may be coated.

As an anode substrate of the anode, metal and alloys, such as tantalum, niobium, titanium, zirconium, and silicon, which forms a passivation film which is stable in treatment water can be used. Conductive diamond, lead dioxide, precious metal, and precious metal oxide can be appropriately selected from a viewpoint of reaction catalytic activity and the like, on the surface thereof in accordance with the use, and coated on the anode substrate as an anode catalyst. As the anode, an anode substrate of ferrite, amorphous carbon, graphite, and the like may be singly used.

As the solid polymer electrolyte separation membrane formed from a cation exchange membrane in the present invention, a cation exchange membrane which has been conventionally known can be widely used. In particular, a perfluorosulfonic acid type cation exchange membrane which has a sulfonic acid group and has chemical stability is suitable.

In the electrolysis devices, various types of functional water and ozone water are generated.

In the present invention, functional water refers to "water whose scientific evidence on a treatment and a function is clarified or is to be clarified among aqueous solutions which acquire a useful function having reproduction property by artificial treatment". As the functional water, various types of functional water such as electrolyzed water and ozone water are provided.

The definition and the type of electrolyzed water are defined as follows, according to the descriptions in the home page of Functional Water Foundation.

The electrolyzed water is a general term of aqueous solutions obtained by performing electrolytic treatment on a tap water, dilute salt water, or the like with a weak DC voltage. Various types of water are obtained in accordance with a difference of a device or an electrolysis condition. Based on the purpose of use, the electrolyzed water is roughly divided into sterilizing electrolyzed water (acidic electrolyzed water such as strongly-acidic electrolyzed water and slightly-acidic electrolyzed water, and electrolytic hypo-water considered as a diluted solution of sodium hypochlorite) used in sanitation management such as washing and disinfection, and alkali electrolyzed water (alkaline ionized water) having an obvious effect of improving gastrointestinal symptoms by routine drinking.

The acidic electrolyzed water is a general term of electrolyzed water having pH of 6.5 or less and refers to acidic electrolyzed water. The acidic electrolyzed water widely shows strong sterilizing power in various pathogenic organisms or drug resistant bacteria (MRSA and the like) thereof. The acidic electrolyzed water is used in various fields such as medicine, dentistry, food, or agriculture. The main sterilization factor is hypochlorous acid produced by electrolysis. Thus, when the strongly-acidic electrolyzed water and slightly-acidic electrolyzed water are designated as food additives, based on the determination of "not having a concern of damaging health of a person" in 2002, the name of "hypochlorous acid" is also assigned.

The strongly-acidic electrolyzed water (strongly-acidic hypochlorous acid water) refers to electrolyzed water mainly containing hypochlorous acid (effective chlorine concentration of 20 to 60 ppm) produced at the anode side in a manner that electrolysis of a salt solution (NaCl) of 0.1% or less is performed in a two-chamber type electrolytic bath in which the anode and the cathode are separated by a separation membrane, and whose pH is equal to or less than 2.7. Strongly-alkaline electrolyzed water refers to electrolyzed water showing strong alkalinity (pH 11 to 11.5) simultaneously generated on the cathode side.

The slightly-acidic electrolyzed water is a hypochlorous acid aqueous solution which has pH of 5 to 6.5 and has effective chlorine of 10 to 30 ppm, and is produced in a manner that hydrochloric acid water of 2% to 6% is subjected to electrolysis in one-chamber type electrolysis device in which the anode and the cathode are not separated by the separation membrane. The slightly-acidic electrolyzed water thus produced has a feature that the whole product is sterile water.

The alkaline ionized water is a general term of weakly-alkaline (pH 9 to 10) drinkable electrolyzed water which is produced in a manner that electrolysis is performed on drinkable water by using a household electrolyzed water generator which is generally referred to as an alkaline ion water conditioner. The household electrolyzed water generator is the name of household medical equipment classified in "tool or instrument type No. 83, medical substance generators" in Order for Enforcement of Pharmaceutical Law. Regarding effects of alkaline ionized water, the following effects are confirmed as a result of rigorous comparative clinical tests causing permission for the generator as medical equipment. That is, the alkaline ionized water is effective in "chronic diarrhea, indigestion, abnormal gastrointestinal fermentation, antacid, and stomach acid hyperacidity". An effect for improving constipation was confirmed. Moreover, its recognition in the Pharmaceutical Law is restated that "the alkaline ionized water has an improved effect on gastrointestinal symptoms" as the Pharmaceutical Law has been revised (2005).

In the present invention, ozone water is an electrolysis product which obtained in a manner that electrolysis is performed on pure water, tap water, a sterilization treatment liquid, waste water, a waste liquid and the like by using the electrolysis cell according to the present invention, and mainly contains an ozone gas. The ozone water may also contain oxygen radicals such as OH radicals or super oxide anions, hydrogen peroxide, and other oxidizing substances. As an action of the ozone water, ozone gas itself acts as the main oxidizing agent at low pH (acidic). At high pH (alkali), the ozone gas is decomposed, and OH radical at this time is consequently generated becoming the main oxidizing agent, so as to exhibit a stronger oxidative power even in a case where the total oxidation equivalent should remain the same.

The present invention can be applied to an electrolysis device for producing hydrogen or oxygen, for producing ozone water, for producing alkaline ionized water, for producing acidic water, for producing slightly-acidic water, and for treating waste water, and the like.

As an operational practice of a cell according to this invention, a procedure type in which a catholyte containing ions of alkaline earth metal flows steadily is suitable. The above effect is also obtained in a procedure type in which an unpurified catholyte containing ions of alkaline earth metal is replaced regularly.

EXAMPLES

Next, the present invention will be described more specifically by using examples and comparative examples. However, the present invention is not limited thereto.

In order to confirm the effects of the invention, an ozone water producing test was performed by using multiple types of porous materials as a cathode. Similarly, an oxygen generation electrolysis test was performed by using an electrolysis cell in which a porous material is used as a cathode. Further, the similar tests were performed on an electrolysis cell having the same structure body which used a general metallic material as a cathode material. Results of the test were compared, and thus the effects of the present invention were verified. Table 1 shows a cell type and materials of a cathode and an anode, which are used in examples and comparative examples.

Example 1

A metallic material having a porous structure through which liquid and gas can pass was used for cathodes. Solid polymer electrolyte separation membranes formed from cation exchange membranes were tightly disposed on both sides of the cathodes, and in addition, anodes obtained by coating niobium bases with conductive diamond were tightly disposed on an outside of each of the solid polymer electrolyte separation membranes so as to form an electrolysis cell having a monopolar stack structure illustrated in FIG. 4. Thereby, a membrane-electrode assembly (projection electrode area of 3.3 cm$^2$, sum of two surfaces of the anode is 6.6 cm$^2$) for confirming the effects was configured.

A plurality of through holes having a diameter of 3 mm are provided in the anode. A plurality of through holes having a diameter of 2 mm are provided at the corresponding locations of the solid polymer electrolyte separation membrane formed from a cation exchange membrane.

Various materials are considered as porous metal for the cathode. For an effect confirmation test, three types of cathode materials, that is, a nickel foam which has a foam polyhedral structure with internal voids, a SUS316L foam, and non-woven fabric which uses SUS316L fiber having a diameter of about 40 μm were selected as representative examples. As a selection criterion from a viewpoint of practicality when using general tap water and the like, it is desirable to select a material that exhibits low liquid passing resistance with a pressure loss of 0.5M Pa or less at a flow rate of passing water of 1 L for each minute per an electrode projection area of 1 cm$^2$. In a case where porosity of the material is low, pressure loss is increased and expecting a sufficient scale suppression effect is not possible. If the porosity is too high, it is difficult to maintain physical strength as a cathode. Thus, the porosity is desirably to be in a range of 50% to 96%.

In the membrane-electrode assembly configured in this manner, as illustrated in FIG. 4, tap water as raw water was supplied at a flow rate of 2 L for each minute in an electrolysis cell accommodated in a housing, and was provided in an ozone water production performance test and a long-term continuous operation test. Ozone concentration in the generated ozone water was measured by a UV absorption type ozone concentration meter. As a power source, a commercial DC constant current power source having capacity of 20 A-40V was used. The temperature of raw water was maintained at 20° C. by a temperature control system since an ozone generation efficiency largely depends on the water temperature. In ozone water generation electrolysis which uses unpurified water containing a small amount of calcium or magnesium such as general tap water, an influence of the dissolved elements remarkably appears as an increase in electrolytic voltage which is a result of scale formation during a continuous operation. If the electrolytic voltage reaches a certain voltage, continuing electrolysis becomes difficult. Thus, when the continuous operation test is performed, a voltage between an anode and a cathode was periodically monitored as the electrolytic voltage at a predetermined interval. Considering the withstand voltage of the anode material and the like, the test was terminated at a time when the voltage reached 25 V. An electrolytic current was set to 2 A. Table 2 shows results of the ozone water production performance test. Table 3 shows results of the long-term continuous electrolysis test, that is, cell voltage increase characteristics.

Example 2

An additional verification test which assumed production of functional water such as production of an electrolytic ionized water was performed. Non-woven fabric using SUS316 fiber described in Example 1 was used as a cathode. The cathode was tightly disposed on one surface of a solid polymer electrolyte separation membrane formed from a cation exchange membrane. An anode obtained in a manner that expanded metal made of pure titanium was coated with platinum was tightly disposed on the opposite surface of the solid polymer electrolyte separation membrane. Thus, a membrane-electrode assembly having the same size (electrode projection area of 3.3 cm$^2$) as that in Example 1 was configured. The back surface of a porous structure body was mechanically supported by expanded metal made of SUS304.

In this example, as illustrated in FIG. 3, an electrolysis cell having a structure in which water to be treated rapidly passed through a gap between a cell housing and the membrane-electrode assembly without providing through holes in the solid polymer electrolyte separation membrane formed from a cation exchange membrane was obtained. Tap water as raw water was supplied to the electrolysis cell configured in this manner at a flow rate of 1 L for each minute, and was provided in the long-term continuous operation test. An electrolytic current was set to 1 A. Due to use of a member prepared from expanded metal made of pure titanium coated with platinum as the anode, the anodic over voltage was low, and ozone was not generated in this test. Thus, the electrolytic voltage was low at an initial time but it was gradually increased as scale precipitates on the cathode similarly to that in Example 1. The test was terminated when a voltage between the anode and the cathode reached 20V, and the total uptime until termination of electrolysis was recorded. Table 3 shows the results.

Comparative Example 1

A SUS304 plate having a plurality of through holes with a diameter of 3 mm and a plain-stitched mesh made of SUS304 (#100) were used as a cathode. An anode and a solid polymer electrolyte separation membrane formed from a cation exchange membrane were tightly disposed, thereby a membrane-electrode assembly in which the anode and the solid polymer electrolyte separation membrane had the same size and the same structure as those in Example 1 was obtained. An electrolysis cell using the membrane-electrode assembly was provided for an ozone water production electrolysis test and the long-term continuous operation test under the same conditions as those in the examples. Tables 2 and 3 show the results.

Comparative Example 2

An electrolysis cell in which a membrane-electrode assembly having the same configuration as that in Example 2 except that expanded metal made of stainless steel was used as a cathode material was accommodated in a housing was provided in the long-term continuous operation test under the same conditions as those in Example 2. Table 3 shows the results.

TABLE 1 cell type, cathode material and anode material which are used in examples and comparative examples

| Type of Examples/ Comparative examples | Cell structure | Anode material | Cathode material | Specifications |
|---|---|---|---|---|
| Example 1 | 1 FIG. 4 | BDD | Ni foam | Pure Ni porous body (regular dodecahedron void) porosity: 93%, thickness: 1.6 mm |
| | 2 FIG. 4 | BDD | SUS foam | SUS316L porous body (regular dodecahedron void) porosity: about 85%, thickness: 2.5 mm |
| | 3 FIG. 4 | BDD | SUS non-woven fabric | SUS316L fiber, diameter of 40 μm porosity: 90%, thickness: 1.5 mm |
| Example 2 | — FIG. 3 | Pt coating | SUS non-woven fabric | SUS316L fiber, diameter of 40 μm porosity: 90%, thickness: 1.5 mm |
| Comparative Example 1 | 1 FIG. 4 | BDD | Perforated SUS plate | SUS304 plate thickness: 2 mm plurality of through holes: 3 mm dia. |
| | 2 FIG. 4 | BDD | SUS mesh | SUS304 wire 0.12 mm dia. #100 plain-stitched mesh |
| Comparative Example 2 | — FIG. 3 | Pt coating | SUS expanded metal | SUS304 plate thickness of 0.8 mm (0.8 T/W 0.8) |

BDD is an abbreviation of a Boron-doped Diamond electrode.

TABLE 2 ozone water production performance test results

| Type of Examples/ Comparative Examples | Cathode Material | Ozone Concentration (ppm) Applied Current | | | | | | Performance at Applied Current of 2 A | | | |
|---|---|---|---|---|---|---|---|---|---|---|---|
| | | 0.5 A | 1.0 A | 1.5 A | 2.0 A | 2.5 A | 3.0 A | Current efficiency (%) | Initial electrolytic voltage (V) | Initial electrolytic power (W) | Initial power efficiency (%) |
| Example 1 | 1 Ni foam | 0.25 | 0.52 | 0.82 | 1.11 | 1.43 | 1.77 | 22.3 | 9.8 | 19.6 | 3.4 |
| | 2 SUS foam | 0.27 | 0.58 | 0.86 | 1.10 | 1.36 | 1.61 | 22.1 | 12.4 | 24.8 | 2.7 |
| | 3 SUS non-woven fabric | 0.24 | 0.57 | 0.89 | 1.23 | 1.59 | 1.97 | 24.7 | 9.5 | 19.0 | 3.9 |
| Comparative Example 1 | 1 Perforated SUS plate | 0.21 | 0.55 | 0.83 | 1.11 | 1.41 | 1.74 | 22.3 | 10.7 | 21.4 | 3.1 |
| | 2 SUS mesh | 0.23 | 0.53 | 0.82 | 1.10 | 1.42 | 1.73 | 22.1 | 10.5 | 21.0 | 3.2 |

TABLE 3 long-term continuous electrolysis test result - cell voltage increase characteristics

| Type of Examples/ Comparative Examples | | Cathode Material | Time to Reach 20 V (hr) | Time to Reach 25 V (hr) |
|---|---|---|---|---|
| Example 1 | 1 | Ni foam | 217 | 249 |
| | 2 | SUS foam | 158 | 180 |
| | 3 | SUS non-woven fabric | 196 | 219 |
| Example 2 | — | SUS non-woven fabric | 224 | — |
| Comparative Example 1 | 1 | Perforated SUS plate | 32 | 38 |
| | 2 | SUS mesh | 36 | 47 |
| Comparative Example 2 | — | SUS expanded metal | 31 | — |

From the results of the above examples and the comparative examples, the followings are inferred.

(1) Effect on Performance

In the electrolysis cell according to the present invention, which uses a porous conductive metallic material as the cathode material, it was estimated that catalytic activity of the cathode would be high, and as a result ozone water production efficiency would be reduced by cathodic reduction of dissolved ozone. However, contrary to the expectation, it was confirmed in the result of the test that ozone water production efficiency was as equivalently high as that with the electrolysis cell using SUS304 plate as the cathode material. In relation, consumed power of the trial cell was in the same level as that of a small PC, and therefore, a battery operation was sufficiently possible. The remarkable effect of the present invention was exhibited in the continuous electrolysis test in which the time for the electrolytic voltage to reach the upper limit of 25V in continuous electrolysis is extended by 3.8 to 7.2 times. After the voltage reached 25 V, maintenance such as washing by acid allows scale to be removed and thus electrolysis can be restarted. However, large elongation in the operation time till maintenance is still highly advantageous in practice. Therefore, in a use having low frequency such as hand washing, long-term operation without maintenance becomes possible.

(2) Discussion on the Effects

As described above, the inventors found that it was possible to significantly reduce an influence of scaling of calcium and the like which are dissolved in water when a porous conductive metallic material was used as a cathode in the electrolysis cell according to the proceeding invention of the inventors. The mechanism is not clear yet at present, however, it is roughly estimated that the mechanism corresponds to any of the following effects or a result of combined actions thereof.

1) Adhesiveness between the anode and the solid polymer electrolyte separation membrane formed from a cation exchange membrane is ensured by a substance with high flexibility, and the micro contact area thereof is extended by micro roughness of the substance, which results in a lower actual current density. In a separate test the inventors confirmed a large current dependency in that "a voltage increase rate due to scaling is proportional to the second to the third power of current density".

2) Deposition of hydroxide of alkaline earth metal such as calcium is not concentrated at a contact portion between the solid polymer electrolyte separation membrane formed from a cation exchange membrane and the cathode, namely at a functional site for hydrogen generation, but is dispersed in the porous cathode. Thus, inhibition of the cathodic reaction is difficult.

3) In addition to 2), fine voids in the cathode function as a kind of storage for scale and effectively delay an occurrence of a lifting phenomenon in which the membrane is separated from the cathode by precipitation of scale at an interface between the cathode and the solid polymer electrolyte separation membrane formed from a cation exchange membrane.

4) The anolyte is diffused and permeated in the porous medium suppressing an increase of pH at a film contact portion of the cathode, and then reducing deposition of scale which is mainly formed of hydroxide with the increase of pH.

INDUSTRIAL APPLICABILITY

The present invention can be applied to the following fields, but is not necessarily limited thereto.

1. Waste water and waste liquid treatment
   1) Treatment device for a waste liquid which contains an organic matter and has high BOD and high COD
   2) Decomposition of dissolved persistent substance
2. Production of electrolyzed water
3. Production of ozone water

REFERENCE SIGNS LIST

1: ELECTROLYSIS CELL
2: MEMBRANE-ELECTRODE ASSEMBLY
3: SOLID POLYMER ELECTROLYTE SEPARATION MEMBRANE
4: ANODE
5: CATHODE

6: THROUGH HOLE PROVIDED IN SOLID POLYMER ELECTROLYTE SEPARATION MEMBRANE
7: THROUGH HOLE PROVIDED IN ANODE
8: THROUGH HOLE PROVIDED IN CATHODE
9: ANODE CHAMBER
10: CATHODE CHAMBER
11: PIPE FOR SUPPLYING RAW WATER
12: OUTFLOW PIPE OF OZONE WATER
13: INFLOW PORT
14: OUTFLOW PORT
15: FLOW PASSAGE
16: SOLID POLYMER ELECTROLYTE SEPARATION MEMBRANE
17: ANODE
18: THROUGH HOLE PROVIDED IN ANODE 17
19: CATHODE
20: THROUGH HOLE PROVIDED IN SOLID POLYMER ELECTROLYTE SEPARATION MEMBRANE
21: MEMBRANE-ELECTRODE ASSEMBLY

The invention claimed is:

1. An electrolysis device comprising:
an electrolysis cell formed in a manner that a membrane-electrode assembly, which comprises an anode, a cathode, and a solid polymer electrolyte separation membrane, is compressed from both sides so as to adhere the anode, the cathode, and the solid polymer electrolyte separation membrane formed of a cation exchange membrane to each other,
wherein the membrane-electrode assembly is configured to adhere the anode and the cathode to both surfaces of the solid polymer electrolyte separation membrane formed of the cation exchange membrane; and
an inflow port that supplies raw water composed of unpurified water containing alkaline earth metal, to at least one of the anode and the cathode,
wherein the electrolysis device is configured to mix an anolyte generated on the anode with a catholyte generated on the cathode in the electrolysis device,
a porous conductive metallic material, which has flexibility and in which multiple fine voids are provided is used as the cathode, and
scale, which is substantially formed of hydroxide of the alkaline earth metal is stored in the fine void in the cathode so as to prevent localized deposition of the scale which is substantially formed of hydroxide of the alkaline earth metal at a contact interface between the cathode and the solid polymer electrolyte separation membrane.

2. The electrolysis device according to claim 1, wherein the electrolysis cell is configured to have a monopolar stack structure in a manner that at least one additional membrane-electrode assembly, which has the same as the structure of the membrane-electrode assembly, is further connected to an outer side of the cathode, the anode, or both the cathode and the anode in the membrane-electrode assembly, so as to bring the cathodes into contact with each other, or bring the anodes into contact with each other, or bring both the cathodes and anodes into contact with each other, in the membrane-electrode assemblies.

3. The electrolysis device according to claim 1, wherein the electrolysis cell is configured to have a bipolar stack structure in a manner that at least one different membrane-electrode assembly, which has the same structure as the structure of the membrane-electrode assembly, is further connected to an outer side of the cathode, the anode, or both the cathode and the anode in the membrane-electrode assembly, so as to bring the cathode and the anode into contact with each other in the membrane-electrode assemblies.

4. The electrolysis device according to claim 1, wherein the cathode is formed by at least one porous conductive metallic material selected from the group of a metal foam, a metallic fiber cloth, and a fibrous metal molded body.

5. The electrolysis device according to claim 1, wherein in a case that the cathode is positioned as an outermost layer of the electrolysis cell, the cathode is supported by a rigidsubstrate formed of a plate material, a mesh, or perforated punching metal.

6. An apparatus for producing electrolyzed ozone water that produces ozone water by performing electrolysis of the unpurified water containing ions of the alkaline earth metal by using the electrolysis device according to claim 1.

* * * * *